Patented Jan. 28, 1941

2,229,997

UNITED STATES PATENT OFFICE 2,229,997

PROCESS FOR THE MANUFACTURE OF TETRAHYDROFURFURYL ACRYLATE AND ITS POLYMERS

Houston V. Claborn, Arlington, Va.; dedicated to the free use of the People of the United States of America No Drawing. Application May 7, 1940,
Serial No. 333,751

4 Claims. (Cl. 260—345)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People of the United States of America to take effect on the granting of a patent to me.

The present invention relates to the process of making tetrahydrofurfuryl acrylate and polymers thereof.

The object of my invention is the preparation of an acrylic ester of high molecular weight and low vapor pressure, a hitherto unknown polymerizable compound, the polymers of which have in controllable degree the properties of fluidity, elasticity, plasticity, tensile strength, electrical resistance, resistance to water, organic liquids and gases, transparency, etc., or, in other words, the properties highly desirable in the group of substances commonly designed as plastics.

It is known that unsaturated hydrocarbons may be produced by the elimination of acetic acid from the acetylated alcohol. For example, 2,4 dimethyl pentene-2 is produced by the pyrolysis of acetylated 2,4 dimethyl pentanol-3. It is also known that unsaturated acids may be formed by the pyrolysis of the acetylated derivatives of polycarboxylic acids. For example, aconitic ester is produced by pyrolysis of the acetylated citric ester, and maleic anhydride is produced by the pyrolysis of acetylated malic anhydride. It is further known that the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid. This tendency increases as the molecular weight of the alkyl group increases. Thus it has not been possible hitherto to produce acrylic esters of high molecular weights (156) and high boiling points by this process.

According to the present invention, I have found that heterocyclic esters of acrylic acid may be produced by pyrolysis of the acetylated corresponding lactic acid ester. For example, tetrahydrofurfuryl acrylate may be produced by the pyrolysis of tetrahydrofurfuryl alpha acetoxypropionate. This invention is concerned with the process of making tetrahydrofurfuryl acrylate and its polymers. The substances formed as intermediate and as final products are the subjects of other patent applications, filed concurrently herewith.

By way of illustration, my process comprises the following technique:

(1) The conversion of lactic acid and tetrahydrofurfuryl alcohol into tetrahydrofurfuryl lactate by esterification, in accordance with the reaction:

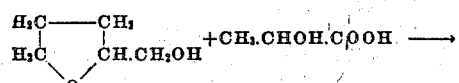

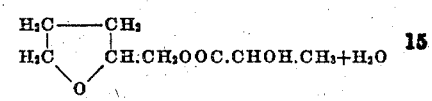

(2) The conversion of tetrahydrofurfuryl lactate into tetrahydrofurfuryl alpha-acetoxy propionate by esterification of the alpha-acetoxy propionate by esterification of the alpha-alcoholic hydroxyl group of the lactate radical by means of acetic anhydride, ketene or other esterifying agent. The reaction when ketene is used as the esterifying agent is:

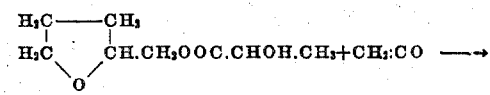

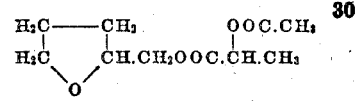

(3) The conversion of tetrahydrofurfuryl alpha-acetoxy-propionate into tetrahydrofurfuryl acrylate and acetic acid by means of pyrolytic decomposition, in accordance with the reaction:

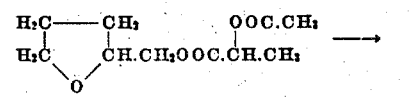

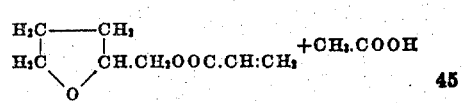

(4) The conversion of tetrahydrofurfuryl acrylate into polymers of more or less complexity and magnitude by means of heat or other aids to polymerization.

The following example describes in detail a preferred procedure for making tetrahydrofurfuryl acrylate and its polymers.

*Example 1.*—Step 1: 204 g. of tetrahydrofurfuryl alcohol (2 moles), 159 g. of 85 percent lactic acid (1½ moles), and 40 cc. of benzene was heated under a reflux condenser. A Detz-Holden type trap was inserted in the condensing system so that the water entrained by the benzene could be removed from the reaction. After 4 hours 46.5 g. of water was removed. The benzene was removed by distillation at atmospheric pressure and the product fractionated at reduced pressure. The second fraction (tetrahydrofurfuryl lactate) boiling point 122–26° C. at 7 mm. weighed 77 grams. The distillation was stopped when the temperature rose to 126 degrees C. and the first fraction, or alcohol, was added to the residue, heated for 4 hours longer and again fractionated. The weight of the ester fraction was 90 grams. After a second heating of the alcohol and the residue the total weight of ester obtained boiling point 122–26° C. at 7 mm. was 230 g. or 88 percent of the theoretical. A fraction boiling point 126–40° C. at 7 mm. remained which weighed 19 grams. The purified ester is a colorless liquid that boils at 132° C. at 12.3 mm. or at 96° C. at 1.9 mm.;

$$d_{25}^{25} = 1.1359; N_D^{25} = 1.4555$$

On hydrolysis it yields the proportiton of lactic acid corresponding quantitatively to the formula given above.

Step 2: Five hundred grams (2.87 moles) of tetrahydrofurfuryl lactate containing one drop of sulfuric acid was treated with 3.08 moles (129 grams) of freshly made ketene gas, it being bubbled through the lactate at the rate of 0.28 mole per hour for 11 hours. The reaction produced heat and the reaction flask became quite warm during the reaction. After the current of ketene was stopped, the reaction flask was allowed to stand overnight and the product distilled under vacuum. The yield was 593 grams of tetrahydrofurfuryl alpha-acetoxyproprionate or 95 percent of theory.

Step 3: Tetrahydrofurfuryl alpha-acetoxyproprionate (300 grams) was allowed to run at a rate of 60 grams per hour into a Pyrex tube 30 inches long and one inch outside diameter, mounted vertically and filled with quartz chips. The glass tube was provided with interchangeable ground glass joints by which a constant-rate-of-flow assembly was attached at the top and a glass condenser at the bottom. The tube was heated by an electric furnace composed of three units. The temperature was maintained at 475° C. as indicated by three thermocouples, placed inside the tube, one at the middle of each of the heating units. The tube was swept out with carbon dioxide before the reaction was started and a slow current of the gas was passed through continuously during the course of the reaction. Hydroquinone (4 grams) was added to the condensate to prevent premature polymerization. The condensate was fractionated at reduced pressure and yielded 107.5 grams of tetrahydrofurfuryl acrylate and 112 grams of unchanged tetrahydrofurfuryl alpha-acetoxypropionate. This represents a yield of 79 percent of theory, based upon the weight of the ester decomposed in the reaction.

Step 4: When it is desired to polymerize tetrahydrofurfuryl acrylate, the ester is first separated from the hydroquinone or other inhibitor of polymerization by distillation under vacuum. It is then polymerized in a mold of the shape desired or if it is desired to form the polymer in the interstices of fabrics or on the surface of paper or leather varying proportions of toluene or other suitable low-boiling diluent may be added, the ester partially polymerized in solution and the mixture applied to the fabric or other material in a thin layer. The film is then heated for approximately 7 hours at a temperature of 100° C. to complete the polymerization.

High-boiling liquids miscible with the acrylate such as diamyl phthalate may be added as plasticizers or softening agents. Miscible polymerizable substances, such as other acrylates or methylacrylates, may be mixed with tetrahydrofurfuryl acrylate and the mixtures subjected to polymerization influences. Polymerization catalysts, such as benzol peroxide, may be used instead of heat to expedite polymerization.

Having thus described my invention, what I claim for Letters Patent is:

1. A process for manufacturing tetrahydrofurfuryl acrylate, which comprises the steps of reacting tetrahydrofurfuryl alcohol with lactic acid to form tetrahydrofurfuryl lactate and water, separating the tetrahydrofurfuryl lactate from the water, thence reacting tetrahydrofurfuryl lactate with an acetylating agent, thereby forming tetrahydrofurfuryl alpha-acetoxypropionate, thence pyrolyzing tetrahydrofurfuryl alpha-acetoxypropionate, thereby forming tetrahydrofurfuryl acrylate and acetic acid, and thence recovering the tetrahydrofurfuryl acrylate.

2. A process for manufacturing tetrahydrofurfuryl acrylate, which comprises the steps of reacting tetrahydrofurfuryl alcohol with lactic acid, thereby forming tetrahydrofurfuryl lactate and water, thence separating the tetrahydrofurfuryl lactate from the water, thence reacting tetrahydrofurfuryl lactate with acetic anhydride, thereby forming tetrahydrofurfuryl alpha-acetoxypropionate, thence pyrolyzing tetrahydrofurfuryl alpha-acetoxypropionate, thereby forming tetrahydrofurfuryl acrylate and acetic acid, and thence recovering the tetrahydrofurfuryl acrylate.

3. A process for manufacturing tetrahydrofurfuryl acrylate, which comprises the steps of reacting tetrahydrofurfuryl alcohol with lactic acid thereby forming tetrahydrofurfuryl lactate and water, thence separating the tetrahydrofurfuryl lactate from the water, thence reacting tetrahydrofurfuryl lactate with ketene thereby forming tetrahydrofurfuryl alpha-acetoxypropionate, thence pyrolyzing tetrahydrofurfuryl alpha-acetoxypropionate thereby forming tetrahydrofurfuryl acrylate and acetic acid, and thence recovering the tetrahydrofurfuryl acrylate.

4. A process for manufacturing tetrahydrofurfuryl acrylate, which comprises the steps of reacting tetrahydrofurfuryl alcohol with lactic acid thereby forming tetrahydrofurfuryl lactate and water, separating the tetrahydrofurfuryl lactate from the water, thence reacting tetrahydrofurfuryl lactate with an acetylating agent, thereby forming tetrahydrofurfuryl alpha-acetoxypropionate, heating tetrahydrofurfuryl alpha-acetoxypropionate at substantially 475° C., thereby converting it into tetrahydrofurfuryl acrylate and acetic acid and thence recovering the tetrahydrofurfuryl acrylate.

HOUSTON V. CLABORN.